United States Patent
Moellmann et al.

(10) Patent No.: US 8,541,571 B2
(45) Date of Patent: Sep. 24, 2013

(54) HOMOGENEOUS SYNTHESIS OF CELLULOSE ETHERS IN IONIC LIQUIDS

(75) Inventors: Eugen Moellmann, Friedberg (DE); Thomas Heinze, Jena (DE); Tim Liebert, Jena (DE); Sarah Koehler, Erfurt (DE)

(73) Assignee: SE Tylose GmbH & Co. KG, Wiesbaden (DE)

( * ) Notice: Subject to any disclaimer, the term of this patent is extended or adjusted under 35 U.S.C. 154(b) by 619 days.

(21) Appl. No.: 12/392,222

(22) Filed: Feb. 25, 2009

(65) Prior Publication Data

US 2009/0221813 A1 Sep. 3, 2009

(30) Foreign Application Priority Data

Mar. 3, 2008 (EP) .................................. 08003876

(51) Int. Cl.
*C07H 1/00* (2006.01)
*C08B 11/00* (2006.01)
*C08B 11/08* (2006.01)
*C08B 11/02* (2006.01)
*C07H 15/04* (2006.01)

(52) U.S. Cl.
USPC .................. 536/124; 536/84; 536/95; 536/96; 536/97; 536/98; 536/99; 536/100; 536/120

(58) Field of Classification Search
USPC ............ 536/84, 95, 96, 97, 98, 99, 100, 120, 536/12, 4
See application file for complete search history.

(56) References Cited

U.S. PATENT DOCUMENTS

| | | | |
|---|---|---|---|
| 1,924,238 A | 8/1933 | Graenacher |
| 1,943,176 A | 1/1934 | Graenacher |
| 3,447,939 A | 6/1969 | Johnson |
| 4,196,282 A | 4/1980 | Franks et al. |

FOREIGN PATENT DOCUMENTS

| | | |
|---|---|---|
| DD | 207 380 | 2/1982 |
| DE | 197 30 090 A1 | 1/1999 |
| EP | 1 293 515 | 3/2003 |
| KR | 2006086069 A | 1/2005 |
| WO | WO 03/029329 A1 | 4/2003 |
| WO | WO 2005/054298 A1 | 6/2005 |

OTHER PUBLICATIONS

MacFarlane et al, "Lewis base ionic liquids", The Royal Society of Chemistry—Chem. Commun., 2006, pp. 1905-1917.*
C. Cuissant et al., "Swelling and Dissolution of Cellulose Part II: Free Floating cotton and Wood Fibres in NaOH-Water-Additives Systems" *Macromol. Symp.*, (2006), 244, 19-30.
T. R. Dawsey et al. "The Lithium Chloride/Dimethylacetamide Solvent for Cellulose: A Literature Review" *Polymer Reviews, Macromol. Sci., Rev. Macromol. Chem. Phys.*(1990), 30:3, 405-440.
A. Isogai et al., "Preparation of Tri-O-Substituted Cellulose Ethers by the Use of a Nonaqueous Cellulose Solvent" *J. Appl. Polym. Sci.* (1984) 29, 3873-3882.
A. Takaragi et al., "Reaction characteristics of cellulose in the LiCl/1,3-dimethyl-2-imidazolidinone solvent system" *Cellulose* (1999) 6, 93-102.
T. Heinze et al., "Unconventional methods in cellulose funtionalization" *Prog. Polym. Sci.* (2001) 26, 1689-1762.
T. Heinze et al., "Carboxymenthylation of cellulose in unconventional media" *Cellulose* (1999) 6, 153-165.
J. Zhou et al., "Homogenous Synthesis of Hydroxyethylcellulose in NaOH/Urea Aqueous Solution" *Macromol. Biosci.* (2006) 6, 84-89.
S. Köehler et al., "New Solvents for Cellulose: Dimethyl Sulfoxide/Ammonium Fluorides" *Macromol. Biosci.* (2007) 7, 307-314.
P. Wasserscheid et al., "Ionic Liquids in Synthesis" WILEY-VCH (2003) 1-6, 41-55, and 67-81.
O.A. El Seoud et al., "Applications of Ionic Liquids in Carbohydrate Chemistry: A Window of Opportunities" *Biomacromolecules* (2007) 8, 2629-2647.
T. Heinze et al., "Ionic Liquids as Reaction Medium in Cellulose Functionalization" *Macromol. Biosci.* (2005) 5, 520-525.
T. Erdmenger et al., "Homogeneous Tritylation of Cellulose in 1-Butyl-3-methylimidazolium Chloride" *Macromol. Biosci.* (2007) 7, 440-445.
V. K. Aggarwal et al., "Unexpected side reaction of imidazolium-based ionic liquids in the base-catalysed Baylis-Hillman reaction" *Chem. Commun.*, (2002) 1612-1613.
J-P Mikkola et al., "Ultrasound enhancement of cellulose processing in ionic liquids: from dissolution towards functionalization" *Green Chem.* (2007) 9, 1229-1237.

* cited by examiner

*Primary Examiner* — Patrick Lewis
*Assistant Examiner* — Everett White
(74) *Attorney, Agent, or Firm* — ProPat, L.L.C.

(57) ABSTRACT

The invention is directed to a simple and new method for the homogeneous synthesis of cellulose ethers. Ionic liquids are not only used as solvent, but also as reaction media for the homogeneous etherification of cellulose. The dissolved cellulose is treated with the etherification agent in the absence of organic and/or inorganic bases and in the absence and/or in the presence of moderate amounts of water. The obtained cellulose ethers show new distributions of substitution on the polymer chain, resulting in new properties and applications.

24 Claims, No Drawings

HOMOGENEOUS SYNTHESIS OF CELLULOSE ETHERS IN IONIC LIQUIDS

CROSS-REFERENCE TO RELATED APPLICATIONS

This application claims priority to EP Patent Application No. 08003876.3 filed Mar. 3, 2008 which is hereby incorporated herein by reference in its entirety.

FIELD OF THE INVENTION

The present invention relates to a process the preparation of cellulose ethers in homogeneous reaction media without using organic or inorganic base. The homogeneous reaction media comprises a solution of cellulose in ionic liquids. Furthermore, the invention relates to cellulose ethers produced by the process.

BACKGROUND OF THE INVENTION

Reaction of Cellulose in Heterogeneous Media

Due to the outstanding properties of cellulose ethers, they have a very wide range of applications and are used in a large number of technical applications and products. Despite their versatility the industrial synthesis of cellulose ethers has not changed considerably since Ernst ad Sponsel published the first industrially feasible process for cellulose ether production in the twenties of the past century.

In the following years, industrial researchers focused on improving this process by introducing different kinds of inert reaction media or by splitting the etherification into several reaction steps. All the industrial efforts were leading to processes that have several facts in common. The reaction is carried out in a heterogeneous way, i.e. cellulose and its reaction intermediates and products never leave their solid form throughout the reaction. Because of this heterogeneity the product quality strongly depends on the quality of the stirring system and on the geometry of the reaction vessel (EP 1 293 515, whose United States equivalent is U.S. Pat. No. 6,667,395).

All of the heterogeneous etherification methods described to-date require an activation of the cellulose previous to the etherification, e.g. by adding caustic soda solution to the reaction media. The caustic soda is needed for breaking the crystalline regions of the cellulose in order to facilitate the access to the etherifying agents and also as a catalyst for the reaction of epoxides and Michael substrates or as stoichiometric reactants when using halogen compounds in terms of a Williamson ether synthesis. Despite its importance for the heterogeneous reaction the alkalization of cellulose is not yet fully understood, and is under vital discussion in the academic press (C. Cuissant and P. Navard, *Macromol. Symp.*, 2006, 244, 19). Considering the ecologic and economic aspects of the heterogeneous pathway, the application of alkali, e.g. high costs as well as energy consumption for the activation of the cellulose, purification of chemicals applied and the polymer degradation, is not preferred. Furthermore, caustic soda together with water is fed to the reaction mixture, which on one hand is needed for the activation of cellulose. On the other hand, water together with caustic soda leads to an increased formation of byproducts, i.e. glycols, alcohols and ethers, as a result of an etherification of the byproducts with unreacted etherification agent. Especially for highly etherified products the etherification efficiency is reduced due to the abundant pathways to create side products, e.g. an efficiency down to 40%. Regarding the neutralization of the reaction mixture, the alkali inevitably produces an undesirably high amount of salt load which has to be removed. Furthermore, the produced cellulose ethers exhibit a dissatisfying distribution of the substituent along and between the polymer chains. Thus, conventional cellulose ethers exhibit incomplete solubility. The regio-selective derivatizations of hydroxyl moieties of the anhydroglucose unit can not be performed in a heterogeneous way. In contrast, homogeneous production of cellulose derivatives allows the development of methods for synthesis of cellulose ethers without activation of cellulose and high yields of products with new and better properties and remedies the disadvantages of the heterogeneous synthesis.

Cellulose Derivatization in Homogeneous Media

Several solvents have been studied with regard to their application as a medium for homogeneous derivatization of cellulose under lab scale conditions. In the last two centuries, different aqueous and non-aqueous cellulose solvent systems were investigated for the etherification of cellulose in homogeneous phase. N,N-dimethylacetamide/LiCl (T. R. Dawsey, C. L. McCormick, J. Macromol. Sci., *Rev. Macromol. Chem. Phys.* 1990, C30, 405) was used as reaction medium for the etherification of cellulose, e.g. methylation, hydroxyethylation, benzylation and carboxymethylation. However, this reaction medium can only be used under lab scale conditions due to bad yields, high costs and energy consumption as well as the purification of the chemicals applied. In the solvent $SO_2$/diethylamine/dimethyl sulfoxide (A. Isogai et al., *J. Appl. Polym. Sci.* 1984, 29, 3873) the preparation tri-O-substituted-cellulose ethers, e.g. tri-O-arylmethylcellulose, was performed. N-methylmorpholine-N-oxide (NMMO, DE 19730090 whose United States equivalents are U.S. Pat. Nos. 6,939,960 and 6,482,940), LiCl/1,3-dimethyl-2-imidazolidinone (A. Takaragi et al., *Cellulose* 1999, 6, 93), N,N-dimethylformamide/$N_2O_4$ (Th. Heinze, T. Liebert, *Prog. Polym. Sci.* 2001, 26, 1689), Ni(tren)(OH)$_2$ [tren=tris(2-aminoethyl)amine] aqueous solutions, melts of $LiClO_4 \times 3H_2O$, (Th. Heinze, T. Liebert, P. Klufers, F. Meister, *Cellulose* 1999, 6, 153), NaOH/aqueous urea solution (J. P. Zhou et al., *Macromol. Biosci.* 2006, 6, 84) and the solvent dimethyl sulfoxide in combination with ammonium fluorides (S. Köhler, Th. Heinze, *Macromol. Biosci.* 2007, 7, 307) also have proved to be appropriate as solvents for the homogeneous preparation of unconventional cellulose derivatives. These solvent systems were not appropriate for application in larger scale due to the complicate and cost-intensive recycling of the solvent, high toxicity, volatility and limited solubility of the high molecular cellulose despite of the multiple opportunities for derivatizations of cellulose. NMMO×$H_2O$ as cellulose solvent is used for shaping (U.S. Pat. No. 4,196,282) and modification of cellulose (e.g. with acrylonitrile and methyl vinyl ketone, U.S. Pat. No. 3,447,939). The carboxymethylation of cellulose under application of sodium hydroxide (DD-PS 207380) as base is described. The etherification of cellulose with reagents with epoxy-or vinyl moieties, e.g. ethylene oxide, acrylonitrile, and with alkyl halides, e.g. methyl chloride is described in DE 19730090 in the presence of bases like sodium hydroxide. Stabilizers have to be applied due to the instability of the solvent.

The use of organic or inorganic bases and the addition of stabilizers results in degradation of the biopolymer and exhibits an enormous drawback for recycling and its application. The formation of side reactions, e.g. homolytic and heterolytic bond splitting, thermal instability or the high temperatures needed for the dissolution process, have hampered the industrial applications for etherification reactions.

Ionic Liquids

However, there is an increasing interest in new efficient and recyclable cellulose solvents. Recently, it was found that ionic liquids possess an enormous potential to dissolve cellulose. The dissolution of cellulose in liquefied N-alkyl-pyridinium or N-benzyl-pyridinium chloride salt, preferably in the presence of anhydrous nitrogen containing bases, such as pyridine, was described in 1934 (U.S. Pat. No. 1,943,176). Nowadays these salts are denominated as ionic liquids, especially room temperature ionic liquids. These molten salts typically show melting points between −100° C. and 300° C. (P. Wasserscheid, T. Welton (eds), *Ionic Liquids in Synthesis* 2003, WILEY-VCH, p. 1-6, 41-55 and 67-81). The solvent properties of ionic liquids can be adjusted simply by the variation of the nature of the anions and cations due to the changing polarity and size. Furthermore, ionic liquids have no measurable vapour pressure and possess thermal stability. The cellulose/ionic liquid solutions are suitable for the etherification and esterification of cellulose. WO 03/029329 (whose United States equivalents are U.S. Pat. Nos. 6,824, 599 and 6,808,557) discloses a dissolution method of fibrous cellulose, wood pulp, linters, cotton balls or paper, i.e. cellulose in highly pure form, in various ionic liquids applying microwave radiation. Ionic liquids like 1-butyl-3-methylimidzolium chloride dissolve cellulose very easily without derivatization and degradation, even with a high degree of polymerization (DP) up to 6500 (O. A. El Seoud et al., *Biomacromolecules*, 2007, 8(9), 2629). It is already shown that ionic liquids are appropriate reaction media for the homogeneous derivatization of cellulose and even with bacterial cellulose. Thus, a large variety of acylation reactions have been described (O. A. El Seoud et al., *Biomacromolecules*, 2007, 8(9), 2629).

Etherification reactions of cellulose in ionic liquids are scarcely reported. In WO2005/054298 (whose United States equivalent is US Published Application 2007/0112185) the dissolution of cellulose in the IL 1-butyl-3-methylimidzolium chloride and its carboxymethylation in the presence of inorganic base, e.g. sodium hydroxide, is disclosed. The synthesized cellulose ether is subsequently separated from the solution. Dissolution and etherification are carried out in the substantial absence of water applying microwave radiation and/or pressure. KR 2006086069 discloses the steps of dissolving cellulose in an imidazolinium-based ionic liquid such as a 1-alkyl-3-alkyl-imidazolinium salt and the etherification of cellulose under homogeneous conditions using a metal hydroxide as catalyst, e.g. NaOH. Th. Heinze, K. Schwikal and S. Barthel also studied the carboxymethylation of cellulose in 1-butyl-3-methylimidazolium chloride in the presence of NaOH (Th. Heinze et al., *Macromol. Biosci.* 2005, 5, 520). Furthermore, the derivatization of cellulose with triphenylmethyl chloride was performed in 1-butyl-3-methylimidazolium chloride using an organic base, e.g. pyridine (T. Erdmenger et al., *Macromol. Biosci.*, 2007, 7, 440). However, the application of organic or inorganic base encompasses severe drawbacks. Besides the polymer degradation under basic conditions, imidazolium-based ionic liquids tend to deprotonate at the C-2 position. The deprotonated imidazolium cation can be added directly to the carbonyl moiety of aldehydes (V. Aggarwal, *Chem. Commun.*, 2002, 1612). Furthermore, incidental salts have to be removed after neutralization and pose a technical challenge. Moreover, the addition of further chemicals is cost-intensive and uneconomical due to their separation, and recycling of the ionic liquids.

A process is also known in which microcrystalline cellulose, cotton linters or Kraft cellulose are dissolved in 1-allyl-3-methyl-imidazolium chloride or 1-butyl-3-methyl-imidazolium chloride, supported by high-power ultrasound irradiation to enhance the dissolution process (J.-P. Mikkola et al., Ultrasound enhancement of cellulose processing in ionic liquids: from dissolution towards functionalization, in Green Chem. 9 [2007] 1229-1237). In the article, carboxyethylation and carboxypropylation of cellulose dissolved in the ionic liquid with 2-chloro-propanoic acid or 2-chloro-butanoic acid are briefly mentioned, without providing any details. The average degree of substitution (DS) of the thus produced cellulose ethers was rather low, except when NaOH was added to the reaction mixture. NaOH on the other hand gave rise to a degradation of the ionic liquid.

WO 2005/054298 A1 discloses a method for preparing a cellulose ether comprising mixing cellulose with an ionic liquid solvent to dissolve the cellulose, and then treating the dissolved cellulose with an etherifying agent in the presence of an inorganic base to form a cellulose ether, and subsequently separating the cellulose ether from the solution. Both the dissolution and the etherifying step are carried out in the absence of an organic base and in the substantial absence of water. The base is added in at least stoichiometric amount and must be neutralized after completion of the reaction, thereby producing a considerable amount of salt which must be washed out and discarded.

Thus, an object of the present invention was to develop a simple process for the preparation of cellulose ether which does not require the addition of any organic and/or inorganic bases and which reduces the salt load. A further object was to develop a process in which the etherification is carried out in a homogeneous reaction mixture, i.e. in which the cellulose is completely dissolved. Another object was provide a process in which a cellulose having a high degree of polymerization (DP) can be employed. A high DP in this respect means a DP of 1,000 or more, in particular 1,500 or more and even as high as 6,500.

SUMMARY OF ADVANTAGEOUS EMBODIMENTS OF THE INVENTION

In accomplishing the foregoing objectives, there has been provided a method for producing cellulose ethers comprising the dissolution of cellulose in ionic liquids, treatment with an etherification agent in the absence of organic or inorganic base and subsequent precipitation of the cellulose ether from the solution, wherein both the dissolution and the etherification are carried out without adding any organic or inorganic bases.

DETAILED DESCRIPTION OF ADVANTAGEOUS EMBODIMENTS OF THE INVENTION

Dissolution and etherification can be carried out in the absence of as well as in the presence of moderate amounts of water and/or catalyst, e.g. organic and inorganic acid.

The dissolution of the cellulose can be carried out between 0C to 250° C., preferably between 10° C. to 170° C., such as between 20° C. and 130° C. The solution is stirred until the cellulose is completely dissolved.

During the dissolution and etherification the application of organic solvents or co-solvents, preferably dimethyl sulfoxide, dimethyl formamide, dimethoxythane and chloroform, are included for adjusting the viscosity of the cellulose solution, polarity of the ionic liquids and miscibility of etherification agent in ionic liquids, but not exclusively.

The dissolution and the etherification can be carried out under a protecting inert gas atmosphere, but this is not mandatory.

Dissolution and etherification are carried out either in the absence or presence of low and/or moderate-low amounts of water, such as between 0 and 25 percent by weight. Preferably the water content is ≧0 percent by weight, particularly preferably 3 to 20 percent by weight, especially 5 to 15 percent by weight, which still promotes the dissolution of cellulose in the ionic liquid.

All types of cellulose, microcrystalline cellulose, spruce sulfite pulp, wood pulp, cotton linters or bacterial cellulose exhibiting a wide range of degree of polymerization up to 6500 are suitable for use.

The cellulose concentration in the ionic liquid is in the range of 1 to 35 percent by weight, preferably in the range of 4 to 20 percent by weight.

The etherification can be carried out at the same temperature as the dissolution of cellulose in ionic liquid between 0° to 250° C. Preferably the etherification is carried out between 20° C. and 130° C.

Surprisingly, an organic or inorganic base is not needed and is accordingly not present during dissolution or etherification of the cellulose ether. It is not yet fully understood why the reaction works well without addition of a base. Heretofore, an activation of the cellulose with a base, such as sodium hydroxide, prior to addition of the etherifying agent was regarded as mandatory.

The etherification can be carried out at a pressure between 100 and 2000 mbar, preferably the etherification is carried out between 1000 and 1300 mbar. Ionic liquid with a melting point between −100° C. and 200° C., preferably between −50° C. and 120° C., can be used.

Ionic liquids are molten salts, preferably with an organic cation and an organic as well as inorganic anion. The cation of the ionic liquid can be preferentially an asymmetric five-membered heterocyclic ring comprising as heteroatom one or more nitrogen, oxygen or sulfur atoms, but not exclusively. The heterocyclic ring can be aromatic or saturated. Exemplary cations are shown in the following figure:

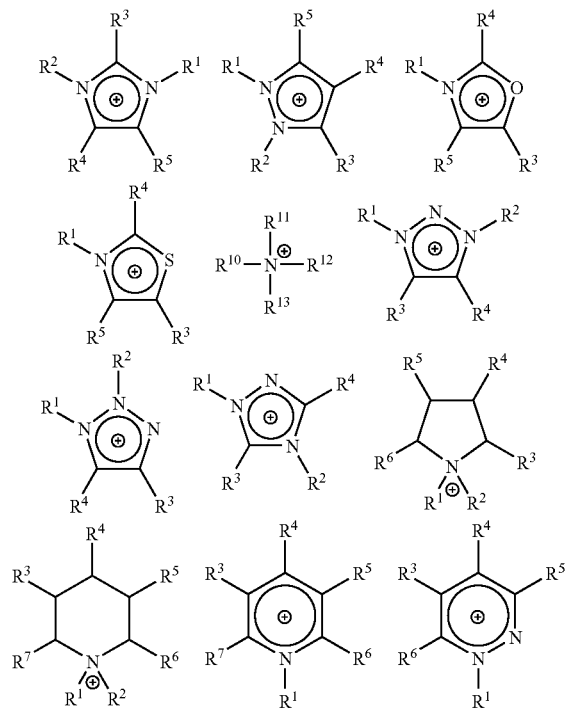

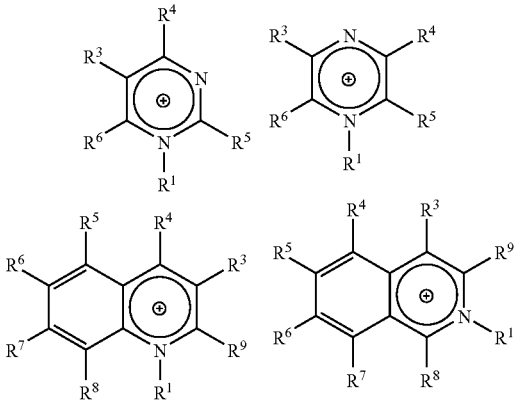

wherein
$R^1$ and $R^2$ independent from each other represent a $(C_1-C_6)$ alkyl or $(C_2-C_6)$alkoxyalkyl group,
$R^3$, $R^4$, $R^5$, $R^6$,
$R^7$, $R^8$ and $R^9$ independent from each other represent a hydrogen or halogen atom, a $(C_1-C_6)$alkyl, $(C_2-C_6)$alkoxyalkyl or a $(C_1-C_6)$alkoxy group (the halogen atom is preferably chloro, bromo or fluoro, especially chloro).

Preferably in the above formulae $R^1$ and $R^2$ are both $(C_1-C_4)$alkyl groups, and $R^3$-$R^9$, when present, are preferably hydrogen atoms.

The term $(C_1-C_6)$alkyl includes methyl, ethyl, propyl, isopropyl, butyl, sec-butyl, isobutyl, pentyl, isomers of pentyl, hexyl and isomers of hexyl. $(C_1-C_6)$alkoxy contains the above $(C_1-C_6)$alkyl bonded to an oxygen atom. $(C_2-C_6)$alkoxyalkyl is an alkyl group substituted by an alkoxy group, the total number of carbon atoms being from two to six.

Preferred cations are five-membered heterocyclic ring with one or more nitrogen, oxygen or sulfur such as:

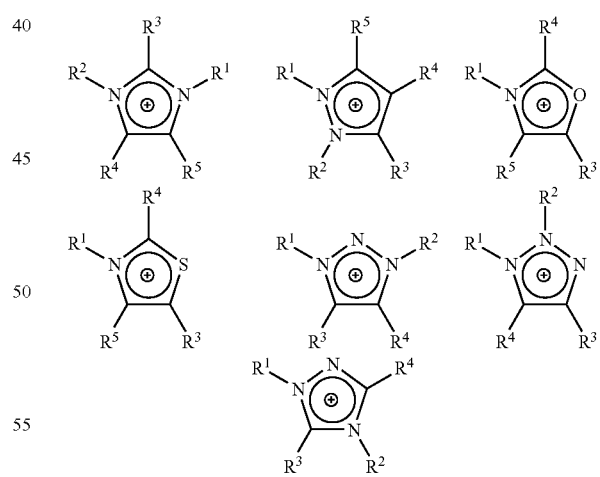

wherein
$R^1$-$R^5$ are as defined above. In this formula $R^3$-$R^5$ are preferably each hydrogen and $R^1$ and $R^2$ are independently $(C_1-C_6)$alkyl or $(C_2-C_6)$alkoxyalkyl. More preferably one of $R^1$ and $R^2$ is methyl and the other is $(C_1-C_6)$alkyl. In this formula $R^3$ can also be halogen, preferably chloro.

The anion of the ionic liquid can be one of the following: halogen, such as chloride, bromide or iodide; pseudohalogen, such as thiocyanate or cyanate; perchlorate; $(C_1-C_6)$carboxylate, such as formate, acetate, propionate, butyrate, lactate, pyruvate, maleate, fumarate or oxalate; nitrate; dicyanoamide; $(C_2-C_6)$carboxylate substituted by one or more halogen atoms such as trichloroacetic acid; $(C_1-C_6)$alkyl sulfonate substituted by one or more halogen atoms such as trifluoromethanesulfonate (triflate); borate, such as tetrafluoroborate and bis[oxalate(2-)]borate; or phosphorus hexafluoride, hexafluoroantimonate and dibutylphosphate.

The preferred anion of the ionic liquid is a carboxylate or halide, e.g. acetate and chloride, if the cation is the following:

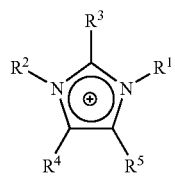

wherein
$R^1$ and $R^2$ independently of each other represent $C_1-C_6$ alkyl and
$R^3$ is hydrogen or methyl,
$R^4$ and $R^5$ are hydrogen.

$R^{10}$, $R^{11}$, $R^{12}$ and $R^{13}$ of the quaternary ammonium cation independently of each other represent $(C_1-C_{30})$alkyl, which can be linear or branched and is preferably a $(C_1-C_{12})$alkyl group; $(C_3-C_8)$carbocyclic, which includes cycloalkyl, cycloalkenyl, phenyl, and phenethyl groups; or $(C_3-C_8)$heterocyclic group, which can be saturated, unsaturated or aromatic, and contains one or more heteroatoms selected from the group consisting of nitrogen, oxygen and sulfur. The corresponding anion for quaternary ammonium salt is halogen, pseudohalogen, perchlorate, $(C_1-C_7)$carboxylate, imides, nitrite or hydroxide.

Preferred ionic liquids are 1-ethyl-3-methyl-imidazolium acetate which is liquid at room temperature, 1-ethyl-2,3-dimethyl-imidazolium acetate and 1-butyl-2,3-dimethyl-imidazolium chloride.

Cellulose ethers can be synthesized using various celluloses with a wide range of degree of polymerization and synthesis can be performed by the following reactions.

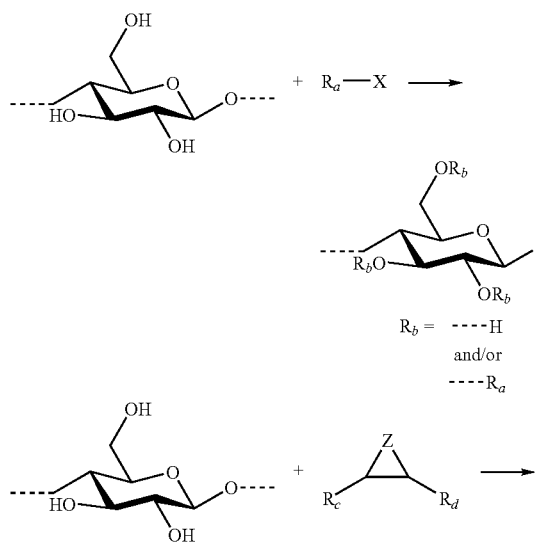

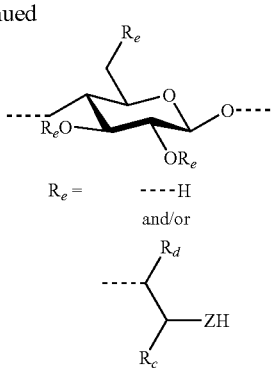

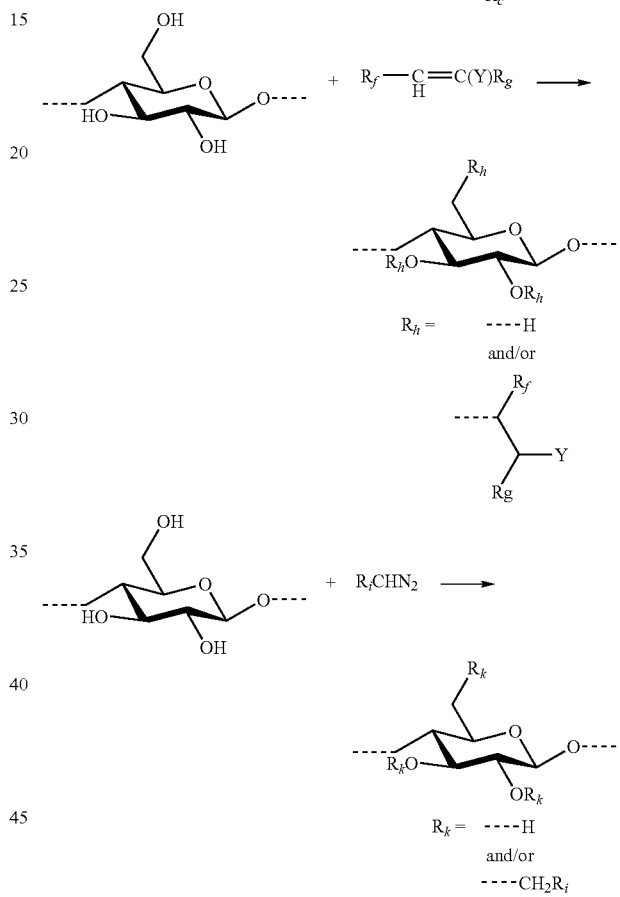

In the above reaction scheme:
$R_a$ represents $(C_1-C_{20})$alkyl, aryl or aryl-$(C_1-C_{20})$alkyl. Alkyl or aryl can be substituted by one or more functional groups selected from carboxyl, hydroxyl, amino, alkoxy, halogen, cyano, carbamoyl, sulfo, phosphoro, nitro and silyl moiety.
$R_a$ can also be silyl substituted by three groups consisting of $(C_1-C_9)$alkyl, aryl and aryl $(C_1-C_3)$alkyl moiety.
$R_b$ represents a hydrogen atom or any of the groups $R_a$
$R_b$ and $R_d$ independently of each other represent hydrogen or $(C_1-C_{20})$alkyl optionally substituted by one or more substituted functional group consisting carboxyl, hydroxyl, amino, alkoxy, halogen, cyano, carbamoyl, sulfo, phosphoro, nitro and silyl moiety,
X represents halogen such as chloride, bromide or iodide or sulfate.
Z represents O (the cyclic compound is an epoxide) or an NH (the cyclic compound is an aziridine).

Y represents an electron-attracting substituent, such as cyano (CN), carbamyol ($CONH_2$) or sulfo ($SO3^{-Na+}$).

$R_f$ and $R_g$ independently of each other represent an hydrogen atom or ($C_1$-$C_3$)alkyl.

$R_i$ represents ($C_1$-$C_5$)alkyl.

The aryl and aryl-($C_1$-$C_3$)alkyl are as defined above. The alkoxy group is preferably ($C_1$-$C_{17}$)alkoxy.

The etherification agent can be added carefully dropwise in portions to the cellulose solution at temperatures between 0C to 250° C., preferably between 20° C. and 130° C.

Organic and inorganic acids or solid-state catalyst can be added in stoichiometric or catalytic amounts, but are not necessary.

Stoichiometric or catalytic amounts of water are not necessary, but can be applied.

The ether group of the cellulose ether prepared by the method of the present invention can be an allyl and $C_1$-$C_{20}$ alkyl group that can be substituted by one or more functional groups comprising alkoxy, aryloxy, halogen, carboxyl, hydroxyl, amino, ammonium, cyano, carbamoyl, sulfo, phosphoro, nitro and silyl, but preferably hydroxyl, alkoxy, aryloxy and halogen.

The aryl group includes naphthyl. The aryl-($C_1$-$C_3$)alkyl group (also termed aralkyl) is an aryl group as defined above bound to the O group of the cellulose by means of an alkyl group containing 1, 2 or 3 carbon atoms. The term aryl ($C_1$-$C_3$)alkyl group includes for example benzyl, diphenylmethyl, triphenylmethyl and phenethyl.

Preferable cellulose ethers produced by the method of the described invention are: 2-hydroxyethyl cellulose, 2-hydroxypropyl cellulose, 2-hydroxybutyl cellulose, 2-hydroxy-3-isopropoxy-propyl cellulose, 3-allyloxy-2-hydroxypropyl cellulose, 3-chloro-2-hydroxypropyl cellulose, (2-hydroxy-3-trimethylammoniumpropyl)-cellulose chloride and 2-hydroxy-3-phenoxypropyl cellulose (see Table 1).

$^{13}$C NMR spectra showed the structure of the produced cellulose ethers. Thus, the $^{13}$C DEPT 135 NMR spectrum of 2-hydroxypropyl cellulose (sample A, molecular substitution 0.89) in DMSO-$d_6$ shows a signal at 102.5 ppm which can be attributed to C-1 adjacent to a C-2 atom bearing a 2-hydroxypropyl moiety. Furthermore, a small peak for the C-3 carbon atom in substituted 2-hydroxypropyl moieties (oxyalkyl chain formation) and a comparatively large peak for the C-3 carbon atom in 2-hydroxypropyl moieties with a free OH function.

The cellulose ethers prepared by the method of the present invention can be both single substituted cellulose ethers exhibiting only one kind of substituent, and mixed cellulose ethers having two or more different substituents.

The obtained cellulose ethers generally show a novel substitution pattern which gives rise to alternative interesting properties of the cellulose ethers. The cellulose ethers obtainable by the process according to the present invention are thus also novel and part of the invention.

After a reaction time of the etherification of cellulose in the range of 0.5 h to 96 h, preferably between 7 h and 20 h, the obtained cellulose ethers can be isolated, preferably by adding the reaction mixture in a non-solvent for the cellulose ether to precipitate the product. The non-solvent should be a solvent for the ionic liquid and miscible with the ionic liquid. With appropriate degree of substitution of the cellulose ether, the non-solvent can be an alcohol, such as a ($C_1$-$C_6$)alkanol, for example methanol, ethanol, propanol or isopropanol. Also other non-solvents, e.g. acetone, acetonitrile, dichloromethane, polyglycols and even water can be applied with appropriate degree of substitution of the cellulose ethers.

Furthermore, the cellulose ethers can also be separated by extraction with an adequate non-solvent for the applied ionic liquid.

If a catalyst is applied, the catalyst can be removed from the ionic liquid preferably by neutralization and removing of the salt formed by preferably filtration or extraction.

If a co-solvent is applied, the co-solvent can be removed by distillation or extraction.

After isolation the obtained cellulose ethers might be purified by using a non-solvent for the cellulose ether (see above) to wash the product and to separate the side products from the obtained cellulose ether. Another method for purification of the obtained cellulose ether is to dissolve the cellulose ether with appropriate degree of substitution in a solvent, e.g. water, aprotic solents, e.g. dimethyl sulfoxide (DMSO), dimethyl formamide (DMF), N,N-dimethylacetamide, alcohols or ketones, such as acetone. After dissolution the cellulose ether is re-precipitated in a non-solvent (see above), e.g. isopropyl alcohol. These two steps are repeated until the obtained cellulose ether is pure, preferably 3 times.

The obtained cellulose ethers can be air-dried, freeze-dried or vacuum-dried, preferably air-dried.

The ionic liquid can be reused after purification. Therefore, the catalyst and the water as well as the precipitation solvent can be removed by appropriate separation methods (see above), preferably solvent can be removed by distillation. The ionic liquid can be dried under high vacuum and at a temperature between 20° C. to 60° C. After all purification is complete, the ionic liquid can be reused.

The advantages of the present invention are:

1) Fast and efficient dissolution of the cellulose in ionic liquids without further activation (no base needed);
2) High-molecular weight cellulose can be dissolved in ionic liquids, even in the presence of a co-solvent;
3) Good solubility of reagents in the ionic liquids;
4) Co-solvents can be used to improve solubility;
5) No or only small amounts of salts are obtained as unwanted by-products compared to processes known from the prior art;
6) Mild reaction conditions;
7) No or only minor degradation of chain length of the cellulose (ether) due to absence of organic and/or inorganic bases;
8) Controlling the degree of substitution by simple variation of the molar ratio of etherification reagent per anhydroglucose unit, reaction time and temperature;
9) Possibility to prepare a wide range of various cellulose ethers, including the possibility to prepare mixed cellulose ethers;
10) Preparation of cellulose ethers with novel substitution distribution pattern and thereby novel properties
11) Economic process for preparation of cellulose ethers comparing to other processes using ionic liquids as reaction medium and microwave radiation and pressure.
12) Fast and economic isolation/purification/drying of the cellulose ether
13) Possibility to recycle the ionic liquid.
14)

The invention is described in more detail in the following non-limiting examples.

EXAMPLES

Dissolution of Cellulose in 1-Ethyl-3-methylimidazolium Acetate

The biopolymer was mixed with 1-ethyl-3-methyl-imidazolium acetate up to 3 h at 70° C. under stirring in air to guarantee complete dissolution. An optical clear solution was obtained.

Example 1

Synthesis of 2-Hydroxypropyl Cellulose

To a solution of 28.04 g cellulose (limiting viscosity number $[\eta]_{Cuen}=116$) in 214.4 g 1-ethyl-3-methyl-imidazolium acetate, 121 ml propylene oxide were carefully added and the reaction mixture stirred for 15.5 h at 70° C. and 8.5 h at 21° C. Afterwards, the reaction mixture was added to 1 l acetone/ethanol-mixture 25:75 and 2-hydroxypropyl cellulose (Table 1, sample A) precipitated. After the product was dissolved in water the solution is added to 4 l ethanol and the product was isolated, washed with ethanol and air-dried.

The completely DMSO- and water-soluble hydroxypropyl cellulose showed MS=0.89 determined by the method of Zeisel (yield 22.1 g).

$^{13}$C NMR (135 MHz, DMSO-d$_6$): δ=102,5 (C-1), 80,5 (C-4), 79 (C-1 in 2-hydroxy-propyl), 75 (C-5), 73,5 (C-2, C-3), 66 (C-2 in 2-hydroxy-propyl), 61 (C-6), 20,5 (C-3 in 2-hydroxy-propyl)

Example 2

Synthesis of 2-Hydroxypropylcellulose

To a solution of 13 g cellulose ($[\eta]_{Cuen}=116$) in 99.3 g 1-ethyl-3-methyl-imidazolium acetate, 118 ml propylene oxide were carefully added and the reaction mixture stirred at 70° C. After 24 h the 2-hydroxypropyl cellulose (Table 1, sample B) was isolated by adding to 1.5 l methanol, washed with methanol and air-dried.

The completely DMSO- and water-soluble hydroxypropyl cellulose showed MS=0.73 determined by the method of Zeisel (yield 13.6 g).

Example 3

Synthesis of 2-Hydroxyethyl Cellulose

To a solution of 6.5 g cellulose ($[\eta]_{Cuen}=116$) in 49.7 g 1-ethyl-3-methyl-imidazolium acetate, 5 ml ethylene oxide every 20 minutes (total amount of ethylene oxide 20 ml) were carefully added under stirring at 80° C. for a total of 19 h. The water-soluble hydroxyethyl cellulose (Table 1, sample G) was isolated by precipitation in 2.5 l isopropyl alcohol, dissolved in water and precipitated in 3 l isopropyl alcohol, washed and air-dried.

The completely DMSO- and water-soluble hydroxyethyl cellulose showed MS=1.07 determined by the method of Zeisel (yield 5.2 g).

$^{13}$C NMR (135 MHz; DMSO-d$_6$): δ=103 (C-1), 82 (C-2-s; C-3 s), 80,5 (C-4), 76,5 (C-5), 74,5 (C-2; C-3), 70,5 (C-1 in 2-hydroxy-ethyl), 61, 60,5.

Example 4

Synthesis of 2-Hydroxyethyl Cellulose

To a solution of 4.0 g cellulose ($[\eta]_{Cuen}=1470$) in 76.2 g 1-ethyl-3-methyl-imidazolium acetate, 4.2 ml ethylene oxide every 20 minutes (total amount of ethylene oxide 41.2 ml) were carefully added under stirring at 80° C. After 19 h reaction time the obtained hydroxyethyl cellulose (Table 1, sample H) was isolated by precipitation in 2.5 l isopropyl alcohol, washed and air-dried.

The hydroxyethyl cellulose showed MS=0.09 determined by the method of Zeisel (yield 4.7 g).

Example 5

Synthesis of 2-Hydroxyethyl Cellulose

To a solution of 5.51 g cellulose ($[\eta]_{Cuen}=350$) in 49 g 1-ethyl-3-methyl-imidazolium acetate, 5.7 ml ethylene oxide every 20 minutes (total amount of ethylene oxide 17.2 ml) were carefully added under stirring at 80° C. After 19 h reaction time the obtained hydroxyethyl cellulose (Table 1, sample I) was isolated by precipitation in 2.5 l isopropyl alcohol, washed and air-dried.

The hydroxyethyl cellulose showed MS =0.36 determined by the method of Zeisel (yield 5.02 g).

Example 6

Synthesis of 3-Allyloxy-2-hydroxypropyl Cellulose

To a solution of 0.5 g cellulose ($[\eta]_{Cuen}=116$) in 4.5 g 1-ethyl-3-methyl-imidazolium acetate, 1.2 ml 1-allyloxy-2,3-epoxypropane every 30 minutes (total amount of 1-Allyloxy-2,3-epoxypropane 3.6 ml) were carefully added under stirring at 80° C. After total 48 h the DMSO-and water-soluble 3-allyloxy-2-hydroxypropyl cellulose (Table 1, sample K) was isolated by precipitation in 400 ml ethanol, dissolved in water, precipitated in 400 ml methanol and washed. The air-dried product was dissolved in water and freeze-dried.

The 3-allyloxy-2-hydroxypropyl cellulose showed MS=0.30 determined by $^1$H NMR spectroscopy after peracetylation (yield 0.45 g).

$^{13}$C NMR (135 MHz; DMSO-d$_6$): δ=138 (C-2 in allyl), 117 (C-3 in allyl), 103 (C-1), 80,5, 75, 72,5, 72, 69, 60,5 (C-6).

Example 7

Synthesis of 2-Hydroxy-3-isopropoxypropyl Cellulose

To a solution of 0.5 g cellulose ($[\eta]_{Cuen}=116$) in 4.5 g 1-ethyl-3-methyl-imidazolium acetate, 4.1 ml 2,3-epoxypropyl isopropyl ether were carefully added under stirring at 80° C. After a total of 48 h the 2-hydroxy-isopropoxy-propyl cellulose (Table 1, sample L) was isolated by precipitation in 400 ml ethanol, dissolved in water, precipitated in 400 ml methanol, washed and dried.

The 2-hydroxy-isopropoxy-propyl cellulose showed MS=0.21 determined by $^1$H NMR spectroscopy after peracetylation (yield 0.40 g).

$^{13}$C NMR (135 MHz; DMSO-d$_6$): δ=103,5 (C-1), 80,5, 75, 73, 71,5, 70, 60,5 (C-6), 22,5

Example 8

Synthesis of 3-Chloro-2-hydroxypropyl Cellulose

To a solution of 0.5 g cellulose ($[\eta]_{Cuen}=116$) in 4.5 g 1-ethyl-3-methyl-imidazolium acetate, 7.3 ml epichlorohydrin were carefully added under stirring at 80° C. After total 48 h the 3-chloro-2-hydroxypropyl cellulose (Table 1, sample M) was isolated by precipitation in 100 ml ethanol, suspended in water, precipitated in 200 ml ethanol, washed and dried.

The 3-chloro-2-hydroxypropyl cellulose showed MS=0.30 determined by elemental analysis (yield 0.31 g).

Example 9

Synthesis of (2-Hydroxy-3-trimethylammoniumpropyl)-cellulose chloride

To a solution of 0.5 g cellulose ($[\eta]_{Cuen}$=116) in 4.5 g 1-ethyl-3-methyl-imidazolium acetate, 14.04 g 2,3-epoxypropyltrimethylammonium chloride (QUAB® 151) were carefully added under stirring at 80° C. After a total of 72 h the (2-hydroxy-3-trimethylammonionopropyl)-cellulose chloride (Table 1, sample N) was isolated by precipitation in 200 ml ethanol, washed and dried.

The (2-hydroxy-3-trimethylammonionopropyl)-cellulose chloride showed MS=0.31 determined by elemental analysis (yield 0.69 g).

Example 10

Synthesis of 2-Hydroxy-3-phenoxy-propyl Cellulose

To a solution of 0.5 g cellulose ($[\eta]_{Cuen}$=116) in 4.5 g 1-ethyl-3-methyl-imidazolium acetate, 14.8 ml phenylglycidylether were carefully added under stirring at 80° C. After a total of 48 h the 2-hydroxy-3-phenoxypropyl cellulose (Table 1, sample O) was isolated by precipitation in 200 ml ethanol, dissolved in DMSO, precipitated in isopropanol, washed and dried.

The 2-hydroxy-3-phenoxypropyl cellulose showed MS=2.00 determined by $^1$H NMR spectroscopy after peracetylation (yield 0.86 g).

$^{13}$C NMR (135 MHz; DMSO-$d_6$): δ=159 (phenyl C-1), 130 (phenyl C-4), 121 (phenyl C-3), 114,5 (phenyl C-2), 102, 83, 78, 75, 72, 70, 68,5, 61.

Example 11

Synthesis of 2-Hydroxy-3-isopropoxvpropyl Cellulose

To a solution of 0.5 g cellulose ($[\eta]_{Cuen}$=116) in 4.5 g 1-butyl-2,3-dimethyl-imidazolium chloride, 4.1 ml 2,3-epoxypropyl isopropyl ether were carefully added under stirring at 100° C. After 18 h the reaction temperature was cooled to 80° C. and stirred at this temperature for further 30 h. The 2-hydroxy-3-isopropoxypropyl cellulose (Table 1, sample P) was isolated by precipitation in 200 ml methanol, washed and dried.

The 2-hydroxy-3-isopropoxypropyl cellulose showed MS=0.25 determined by $^1$H NMR spectroscopy after peracetylation (yield 0.47 g).

Example 12

Recycling of the Ionic Liquid 1-Butyl-2,3-dimethylimidazolium chloride

After isolation of 2-hydroxy-3-isopropoxypropyl cellulose (Table 1, sample P) by precipitation in methanol the filtrate of sample 11 was concentrated by evaporation. The obtained ionic liquid was diluted with 10 ml distilled water and this solution was extracted with 30 ml ethyl acetate 5 times to remove all poly-2-isopropoxymethyl-ethylene glycol of the ionic liquid. The water of the ionic liquid is removed by evaporation following by drying under high vacuum. The purity of the recycled ionic liquid is proved by NMR spectroscopy. The obtained signals are identical to the signals of the $^1$H NMR spectrum of the starting ionic liquid.

Example 13

Synthesis of 3-Allyloxy-2-hydroxypropyl Cellulose

To a solution of 0.5 g cellulose ($[\eta]_{Cuen}$=116) in 4.5 g 1-ethyl-3-methyl-imidazolium acetate, 2.16 ml propylene oxide and 3.63 ml 1-allyloxy-2,3-epoxypropane were carefully added together under stirring at 80° C. After a total of 48 h the 3-allyloxy-2-hydroxypropyl cellulose (Table 1, sample Q) was isolated by precipitation in 200 ml methanol, dissolved in 150 ml water and dialyzed against water (SPECTRA/POR® membrane, molecular weight cut-off 3500 gmol-1) for 4 d. The deionized water was exchanged 5 times in a period of three days. The product was obtained after freeze drying of the aqueous biopolymer solution (yield 0.54 g).

Example 14

Synthesis of 2-Hydroxypropyl Cellulose

To a solution of 0.4 g cellulose ($[\eta]_{Cuen}$=116) in 9.6 g benzyldimethyl-tetradecylammonium chloride dehydrate, 1.73 ml propylene oxide were carefully added dropwise under stirring at 80° C. and reacted for a total of 48 h. The hydroxypropyl cellulose (Table 1, sample R) was isolated by precipitation in 250 ml ethanol, washed and air-dried (yield 0.33 g).

TABLE 1

Results of the etherification of cellulose in 1-ethyl-3-methylimidazolium acetate

| | Reaction conditions | | molar ratio | temp. | time | Product Properties | |
|---|---|---|---|---|---|---|---|
| No.: | cellulose type | etherification reagent (ER) | AGU:ER | (° C.) | (h) | MS | Solubility |
| A | microcrystalline cellulose | propylene oxide | 1:10 | 70 | 15.5 | 0.89 | $H_2O$ |
| | | | | 21 | 8.5 | | |
| B | microcrystalline cellulose | propylene oxide | 1:10 | 70 | 24 | 0.73 | $H_2O$ |
| C | microcrystalline cellulose | propylene oxide | 1:10 | 80 | 3 | 0.07 | — |
| D | microcrystalline cellulose | propylene oxide | 1:10 | 80 | 19 | 0.62 | $H_2O$ |
| E | microcrystalline cellulose | ethylene oxide | 1:5 | 80 | 19 | 0.19 | DMSO |
| F | microcrystalline cellulose | ethylene oxide | 1:5 | 80 | 7 | 0.14 | — |
| | | | | 21 | 66 | | |
| G | microcrystalline cellulose | ethylene oxide | 1:10 | 80 | 19 | 1.07 | $H_2O$ |

TABLE 1-continued

Results of the etherification of cellulose in 1-ethyl-3-methylimidazolium acetate

| | Reaction conditions | | molar ratio | temp. | time | Product Properties | |
|---|---|---|---|---|---|---|---|
| No.: | cellulose type | etherification reagent (ER) | AGU:ER | (° C.) | (h) | MS | Solubility |
| H | cotton linters | ethylene oxide | 1:10 | 80 | 19 | 0.09 | — |
| I | Pulp | ethylene oxide | 1:10 | 80 | 19 | 0.36 | DMSO |
| K | microcrystalline cellulose | 1-allyloxy-2,3-epoxypropane | 1:10 | 80 | 48 | 0.30 | DMSO, H$_2$O |
| L | microcrystalline cellulose | 2,3-epoxypropyl isopropyl ether | 1:10 | 80 | 48 | 0.21 | DMSO |
| M | microcrystalline cellulose | epichlorohydrine | 1:30 | 80 | 48 | 0.30 | — |
| N | microcrystalline cellulose | 2,3-epoxypropyltrimethylammonium chloride | 1:30 | 80 | 72 | 0.31[a] | — |
| O | microcrystalline cellulose | phenylglycidylether | 1:30 | 80 | 48 | 2.00 | DMSO |
| P[b] | microcrystalline cellulose | 2,3-epoxypropyl isopropyl ether | 1:10 | 100 80 | 18 30 | 0.25 | DMSO |
| Q | microcrystalline cellulose | propylene oxide/1-allyloxy-2,3-epoxypropane | 1:10:10 | 80 | 48 | 2.16 | H$_2$O |
| R[c] | microcrystalline cellulose | propylene oxide | 1:10 | 80 | 48 | 0.02 | — |

[a]Degree of substitution
[b]Reaction was carried out in the ionic liquid 1-butyl-2,3-dimethylimidazolium chloride
[c]Reaction was carried out in the ionic liquid benzyldimethyl(tetradecyl)ammonium chloride dihydrate That which is claimed:

1. A process for the production of cellulose ethers comprising the steps of
    dissolving cellulose in a solvent comprising an ionic liquid in the absence of (a) inorganic bases; and (b) organic bases that are not ionic liquids,
    adding to the dissolved cellulose at least one etherifying agent without addition of organic or inorganic base to the solution in order to produce a cellulose ether,
    adding the reaction mixture to a non-solvent for the cellulose ether obtained in the etherifying reaction, and thereby precipitating the cellulose ether,
    separating off the cellulose ether and
    purifying the cellulose ether.

2. A process as claimed in claim 1, wherein the ionic liquid exhibits a melting point in the range of from −100 to +200° C.

3. A process as claimed in claim 2, wherein the ionic liquid exhibits a melting point in the range of from −50 to +150° C.

4. A process as claimed in claim 2, wherein the ionic liquid exhibits a melting point in the range of from 50 to 120° C.

5. A process as claimed in claim 1, wherein the solvent comprising an ionic liquid further comprises a co-solvent.

6. A process as claimed in claim 5, wherein the co-solvent comprises water, dimethyl sulfoxide, N,N-dimethyl acetamide, dimethoxyethane, chloroform or mixtures thereof.

7. A process as claimed in claim 5, wherein the solvent comprising an ionic liquid further comprises a co-solvent in an amount of up to less than 50% by weight, relative to the total weight of the solvent.

8. A process as claimed in claim 5, wherein the solvent comprising an ionic liquid further comprises a co-solvent in an amount of up to 20% by weight, relative to the total weight of the solvent.

9. A process as claimed in claim 1, wherein the solvent comprises up to 25% by weight of water, relative to the total weight of the solvent.

10. A process as claimed in claim 9, wherein the solvent comprises up to 15% by weight of water, relative to the total weight of the solvent.

11. A process as claimed in claim 1, wherein the non-solvent for the cellulose ether is a solvent for the ionic liquid.

12. A process as claimed in claim 1, wherein the non-solvent for the cellulose ether is an alcohol, a ketone, acrylonitrile, an oligo- or polyglycol, water or mixtures thereof.

13. A process as claimed in claim 12, wherein the alcohol is a straight-chain or branched (C$_1$-C$_6$) alkanol.

14. A process as claimed in claim 1, wherein the amount of cellulose in the solution comprising an ionic liquid is in the range of from 1 to 35% by weight of cellulose, relative to the total weight of the solution.

15. A process as claimed in claim 14, wherein the amount of cellulose in the solution comprising an ionic liquid is in the range of from 4 to 20% by weight, relative to the total weight of the solution.

16. A process as claimed in claim 1, wherein a cation in the ionic liquid comprises one or more cations selected from the group consisting of

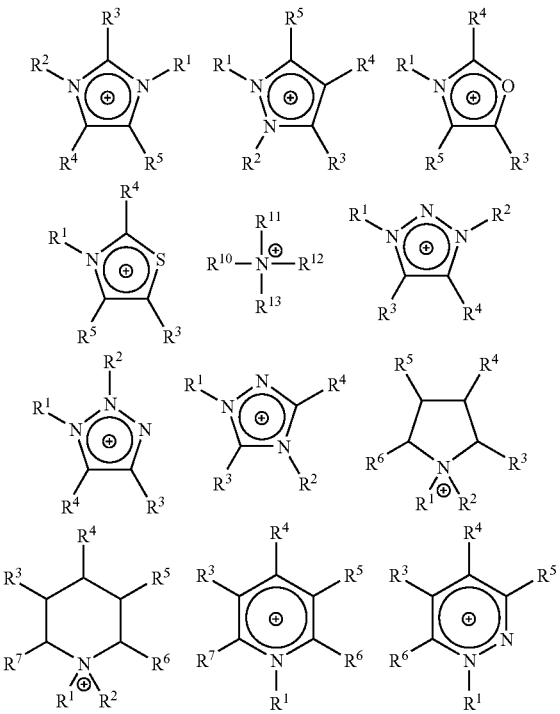

-continued

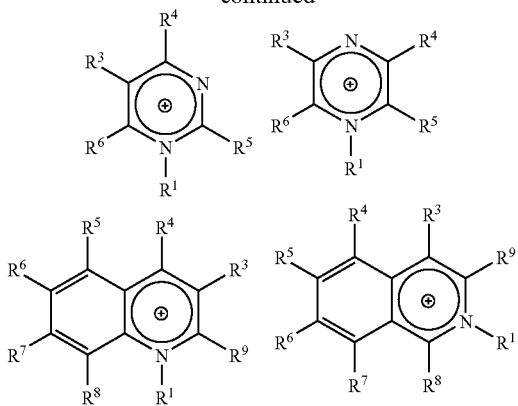

wherein
$R^1$ and $R^2$ independently from each other represent a $(C_1-C_6)$alkyl or $(C_2-C_6)$alkoxyalkyl group,
$R^3$, $R^4$, $R^5$, $R^6$, $R^7$, $R^8$ and $R^9$ independently from each other represent a hydrogen or halogen atom, a $(C_1-C_6)$ alkyl, $(C_2-C_6)$alkoxyalkyl or a $(C_1-C_6)$alkoxy group.

17. A process as claimed in claim 16, wherein $R^1$ and $R^2$ are both $(C_1-C_4)$alkyl groups, and $R^3$-$R^9$, if present, are hydrogen atoms.

18. A process as claimed in claim 1, wherein an anion in the ionic liquid comprises one or more anions selected from the group consisting of halide; pseudohalide; perchlorate; $(C_1-C_6)$carboxylate; nitrate; dicyanoamide; $(C_2-C_6)$carboxylate substituted by one or more halogen atoms; $(C_1-C_6)$alkyl sulfonate substituted by one or more halogen atoms; borate; phosphorus hexafluoride, hexafluoroantimonate and dibutylphosphate.

19. A process as claimed in claim 18, wherein the halide is chloride, bromide or iodide; the pseudohalide is thiocyanate or cyanate; the $(C_1-C_6)$carboxylate is formate, acetate, propionate, butyrate, lactate, pyruvate, maleate, fumarate or oxalate; the $(C_2-C_6)$carboxylate substituted by one or more halogen atoms is trichloroacetate; the $(C_1-C_6)$alkyl sulfonate substituted by one or more halogen atoms is trifluoromethanesulfonate; and the borate is tetrafluoroborate or bis[oxalate(2-)]borate.

20. A process as claimed in claim 1, wherein the ionic liquid is 1-ethyl-3-methyl-imidazolium acetate, 1-ethyl-2,3-dimethyl-imidazolium acetate, 1-butyl-2,3-dimethyl-imidazolium chloride or mixtures thereof.

21. A process as claimed in claim 1, wherein the cellulose ether is 2-hydroxy-ethyl cellulose, 2-hydroxy-propyl cellulose, 2-hydroxy-3-isopropoxy-propyl cellulose, 3-allyloxy-2-hydroxy-propyl cellulose, 3-chloro-2-hydroxy-propyl cellulose, chloride of 2-hydroxy-3-trimethylammonium-propyl cellulose or 2-hydroxy-3-phenoxy-propyl cellulose.

22. A process as claimed in claim 1, wherein the etherifying agent is selected from the group consisting of alkyl halides, alkyl sulfates, epoxides, aziridines, acrylonitriles, acrylamides, vinylsulfonates and diazoalkanes.

23. A process as claimed in claim 1, wherein a catalyst is present during the etherification reaction and the catalyst is an organic or inorganic acid or a solid-state catalyst.

24. A process as claimed in claim 1, wherein the ionic liquid is recycled from the non-solvent for the cellulose ether.

* * * * *